United States Patent [19]

Blazek

[11] Patent Number: 4,482,971

[45] Date of Patent: Nov. 13, 1984

[54] WORLD WIDE CURRENCY INSPECTION

[75] Inventor: Henry Blazek, Brookfield, Conn.

[73] Assignee: The Perkin-Elmer Corporation, Norwalk, Conn.

[21] Appl. No.: 340,138

[22] Filed: Jan. 18, 1982

[51] Int. Cl.$^3$ ............................................... G06K 9/04

[52] U.S. Cl. ........................................ 364/552; 382/7; 382/44

[58] Field of Search ............... 364/419, 552, 408, 507, 364/550, 551; 382/7, 30, 33, 34, 44; 356/392–394

[56] References Cited

U.S. PATENT DOCUMENTS

| | | | |
|---|---|---|---|
| 3,496,371 | 2/1970 | Endo | 382/7 |
| 3,727,183 | 4/1973 | Lemay | 382/34 |
| 3,748,644 | 7/1973 | Tisdale | 382/34 |
| 4,131,879 | 12/1978 | Ehrat | 382/7 |
| 4,197,584 | 4/1980 | Blazek | 364/419 |
| 4,288,781 | 9/1981 | Sellner et al. | 382/7 |
| 4,311,914 | 1/1982 | Huber | 382/30 |

*Primary Examiner*—Edward J. Wise
*Attorney, Agent, or Firm*—Thomas P. Murphy; Edwin T. Grimes; Francis L. Masselle

[57] ABSTRACT

An apparatus for detection of flaws in currency having multiple misregistered images. Optical means scan a test note to provide a plurality of outputs each representative of a particular patch value of a particular scan line of the test note. Generating means provide a plurality of outputs each representative of a particular patch value of a particular scan line of a reference note which is generated in real time as the test note is scanned. The generating means includes means to insure that each generated reference patch value is provided for comparison with the corresponding patch value of the test note. Each reference patch value is generated for any value of misregistration between the multiple images within a predetermined tolerance.

13 Claims, 3 Drawing Figures

COMPUTATION OF CROSS CORRELATION FUNCTION

GRAPHICAL DETERMINATION OF MASTER MEMORY ADDRESS AND VARIABLES IN TAYLOR SERIES EXPANSION

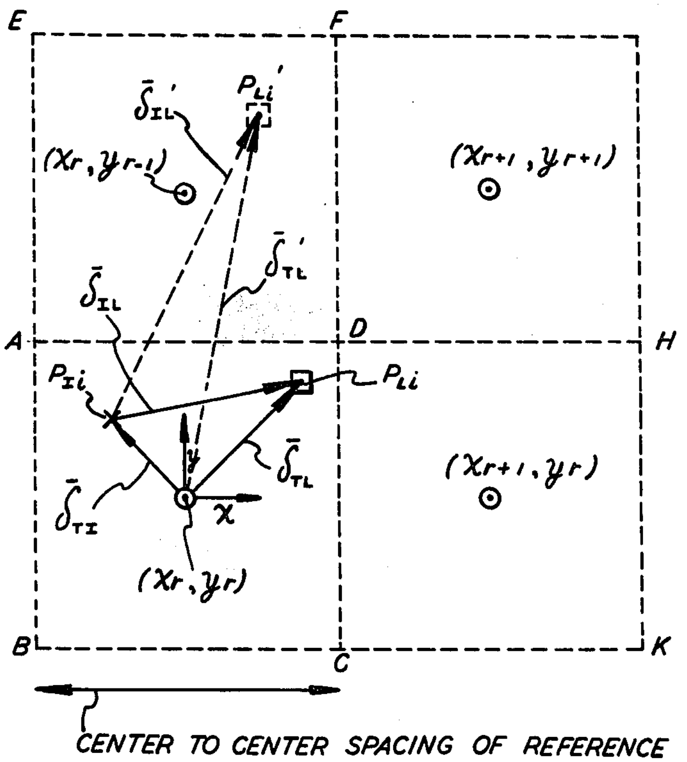

○ → REFERENCE POINTS ON SYNTHETIC MASTER NOTE

X → POSITION ON SYNTHETIC MASTER NOTE OF CENTROID OF INTAGLIO IMAGE ON iTH PATCH ON TEST NOTE (INDICATED BY $P_{Ii}$)

□ → POSITION ON SYNTHETIC MASTER NOTE OF CENTROID OF LITHO IMAGE ON iTH PATCH ON TEST NOTE (INDICATED BY $P_{Li}$)

$\bar{\delta}_{TI}$ = VECTOR DISPLACEMENT OF $P_{Ii}$ WITH RESPECT TO REFERENCE POINT $(x_r, y_r)$ $\bar{\delta}_{TL}$ = VECTOR DISPLACEMENT OF $P_{Li}$ WITH RESPECT TO REFERENCE POINT $(x_r, y_r)$ $\vec{\delta}_{IL}$ = VECTOR IMAGE MISREGISTRATION OF LITHO WITH RESPECT TO INTAGLIO ON iTH PATCH ON TEST NOTE

FIG. 3

WORLD WIDE CURRENCY INSPECTION

BACKGROUND OF THE INVENTION

Inspection of newly printed currency or similar documents is a necessary step in its production process to insure that flawed documents do not reach the public. Inspection is also a means of discovering defects in the machinery used in producing the notes.

Until recently all inspection of newly printed currency has been done visually by inspectors especially trained to detect unacceptably flawed notes. However, visual inspection of notes is slow, costly, subject to error and a waste of human resources.

To overcome the problems associated with visual inspection the step of inspection has been automated. One typical apparatus for automatic inspection of currency notes comprises optical scanner means past which the notes are transported. The data obtained by scanning is then compared with corresponding data representative of a perfect master note stored in a memory. In such systems it is critical that data being scanned on the test note be registered with the data being read out of memory to assure that exactly corresponding areas of the test and stored master note are being compared. Such a memory registration system is disclosed in U.S. patent application Ser. No. 957,767 entitled Memory Registration System, filed Nov. 3, 1978 having the same assignee as the present application.

Such systems require a scanning system, a master note memory, and means for registering the test note with the stored master note and are relatively simple in concept since they are used in the inspection of currency produced by a single printing process such as used in printing U.S. currency. In such a process only one image is formed on the note.

In contrast to U.S. currency most of the world's currency is produced by two and sometimes more separate printings. For example, British currency is printed by two printing units employing two processes: intaglio, and lithographic. The intaglio printing unit applies the main design on the front of the note. At the lithographic printing unit, tints are applied to the front and back and the main design is put on the back. This two step process can and does result in positional variations between the two images, i.e., the intaglio image and the lithographic image. There is a predetermined maximum tolerance of misregistration between the two images beyond which the test note is rejected as flawed. In most currencies the maximum acceptable tolerance is ±2 mm in both length and width. Aside from the printing processes misregistration between images may occur due to paper distortion.

Due to the existence of misregistered images the use of a single stored master note is not feasible in the inspection of such currency. Since variation between images may have any value within the maximum acceptable tolerance, theoretically an infinite number of master notes would have to be stored. This, of course, is impossible. However, since for most purposes the maximum acceptable error of image misregistration between stored adjacent master notes is 0.05 mm and the maximum image misregistration is ±2 mm, there are 80 intervals in both directions of misregistration giving 80×80 or 6400 different master notes that could be stored in memory. The appropriate one of these notes could then be retrieved from memory and compared with the test note being scanned.

While this is a feasible method of inspection it is highly impractical due to the large amount of memory required to store 6400 master notes.

The present invention relates to an apparatus which overcomes the above mentioned problems by effectively generating in real time a master note for each test note scanned.

BRIEF SUMMARY OF THE INVENTION

The present invention relates to an apparatus for the flaw inspection of currency or similar documents in which two images are superimposed by two separate printing processes and wherein misregistration between these two images is acceptable up to a predetermined maximum tolerance.

Broadly, the present invention solves a second order polynomial equation to generate each reference patch value of the plurality of the reference patch values which make up a perfect hypothetical or synthetic master note having the same image misregister as a test note being scanned in real time. The technique may be regarded as a process in which a reference patch stored in the master note memory is modified to conform exactly to a specific test patch being examined in real time. Ideally, the modification is such that if the test is obtained from an acceptable note the difference between the reference and test patch is zero.

In other words, each solution of the polynomial equation provides a number representative of the reflectance of a reference patch value integrated over the area of the reference patch. All reference patch values generated for the hypothetical master note are peculiar to the particular test note being scanned and compensate for the misregistration of the two images peculiar to the particular test note being scanned. If the misregistration between images of the test note being scanned exceeds the predetermined maximum tolerance the test note is rejected as unacceptable. Each reference patch value generated is registered with and compared to its counterpart patch value obtained by scanning the test note which is accepted only if the comparisons meet preestablished criteria. Once the hypothetical master note is generated, the comparison with its associated test note is equivalent to comparing a previously stored master note with a scanned test note as is done in the quality inspection of United States currency. A technique for such comparison is described in U.S. Pat. No. 4,197,584 entitled "Optical Inspection System For Printing Flaw Detection" issued Apr. 8, 1980 and assigned to the same assignee as the present invention as well as Application Ser. No. 957,767 referenced above.

The number of constants and variables in the polynomial equation that must be solved for each reference patch value is dependent on the number of images printed on the currency notes or like documents to be inspected. In a two image system such as described in the present invention a polynomial equation of fifteen constants and four variables has been found adequate to provide acceptable approximations of the reference patch values of the reference note. A different set of constants and variables are required for the solution of each reference patch value.

More particularly, the present invention comprises a reference patch value generator subsystem which formulates a set of four variables for each patch of a scanned test note. In addition, the reference patch value generator subsystem formulates the address of the required set of the fifteen constants which together with the four variables are required for the solution of the polynomial equation associated with each particular reference patch value of the master note.

Memory means store a large number of previously calculated constants fifteen of which are addressed and brought out of memory by the reference patch value generator for the real time solution of each reference patch value of the master note.

The reference patch value generator subsystem comprises cross-correlation means which receives high resolution registration data via high resolution scanner means representative of three intaglio and three lithographic patches on the test note and correlates this with corresponding patches stored in memory representative of intaglio and lithographic master note information stored in memory. The cross-correlation means establishes "fixes" between local areas on the test note and corresponding areas on the reference note. These fixes consist of two coordinates defining the centroid of a local area on one test note and two coordinates defining the centroid of the same image (intaglio or lithographic) on the master notes. These local images are selected to be predominately intaglio or litho. A minimum of 3 fixes is obtained for each image (intaglio and litho). These fixes are used to derive the constants in a transformation equation which relate corresponding points on reference and test images. When two images are present this process is performed twice. The first time, for example, the corresponding points are corresponding points in the intaglio images and the intaglio transformation constants are determined in the intaglio coefficient processor. The second time the corresponding points are corresponding points in the litho images and the litho transformation constants are determined in the litho coefficient processor. The centroid of each test patch is transformed onto the master note twice, once using the intaglio transformation constants and once using the litho transformation constants. This results in two patch centroids on the master note for each patch centroid on the test note. The coordinates at these points are used to generate the address in memory of the appropriate set of fifteen constants for the particular reference patch value being formulted. At the same time the appropriate set of four variables is computed. The separation of the two centroids referred to above is a direct measure of the image misregistration on the corresponding test patch.

The above four variables and fifteen constants are transmitted to a reference patch value processor which solves the polynomial equation for the appropriate patch reference value which is provided as an input to an exceedance detector. An inspection scanner provides inputs to the exceedance detector wherein the test patch value is compared with its corresponding reference patch value from the master note. After the test note has been completely compared with the hypothetical master note, a determination is made of the acceptability or unacceptability of the test note.

Thus, instead of storing a perfect master note and comparing it to each test note scanned the present invention generates a hypothetical synthetic master note having the same misregistration between image as the test note scanned.

To accomplish this the present invention utilizes a series approximation technique which divides the computational burden between the real time on-line processor and off-line, previously calculated and stored data which together with the data provided by scanning each test note is processed to generate a synthetic master note memory. The synthetic master note memory is essentially a mathematical representation of a note in any allowable misregistration. The mathematical representation is a string of derived constants which are the coefficients of a four variable Taylor series expansion. The four variables are generated in real time for each examination patch on the test note and represents the actual location at these patches of the intaglio and lithographic printing such that distortions of the note as well as image misregister are accommodated.

Generation of the synthetic master memory for a note begins with the optical scanning, digitizing and storing of reflectance data of a composite note, an intaglio separation image and a lithographic separation image. This composite image is then separately correlated to the intaglio and lithographic images. This step maps the points in the intaglio and lithographic images to the corresponding points in the composite image, i.e., the separation images are electronically stretched or compressed in both coordinate directions and then rotated so that they exactly match their respective images in the composite note. This yields rectified, compensated intaglio and lithographic images. The images are then shifted in small increments (approximately 0.1 mm) over the allowable range of misregister. At each position of shift, the images are added according to an addition algorithm developed specifically for this purpose. Patches of approximately 1 mm×1 mm are then formed from this data which are multiplied by the necessary Taylor series convolutes. This computation results in an array of constants which describe how patch reflectance varies about a reference point as a function of position with respect to the reference point. The reference point is the expansion point of the Taylor series expansion. The position with respect to the reference point is the variable in the Taylor series expansion. In the language of mathematics each of the four variables which define a unique patch reflectance is expressed in the general form:

$$X = X_r + \Delta X$$

where $X$ = any one of 4 coordinates which specify a unique patch $X_r$ = reference point which determines a region in which Taylor series applies, i.e., the Taylor series expansion point. The spacing between reference points is selected to meet accuracy requirements.

$\Delta X$ = variable in Taylor series expansion

Hence the format for uniquely defining a specific patch value is:

$$P(X_1, X_2, X_3, X_4) = F(X_{1r}, X_{2r}, X_{3r}, X_{4r}, \Delta X_1, \Delta X_2, \Delta X_3, \Delta X_4)$$

where:

$X_{1r}$, $X_{2r}$, $X_{3r}$, $X_{4r}$ define a reference (expansion) point in 4 variables which defines an array, $\Delta X_1$, $\Delta X_2$, $\Delta X_3$, $\Delta X_4$, define the coordinate of the patch with respect to the reference (expansion) point which locates a patch value in the array.

Two of the above variables (e.g., $X_1$ $X_2$) define the location of the centroid of the patch of intaglio image on the composite note.

The second two variables ($X_3$, $X_4$) define the location of the centroid of the patch of the lithographic image. For the condition of zero-misregistration between intaglio and lithographic images $X_1=X_3$ and $X_2=X_4$. The coordinates of the reference point, i.e., ($X_{1r}$, $X_{2r}$, $X_{3r}$, $X_{4r}$) define an address in the synthetic master memory which locates the constants required at that reference point. These constants plus the four variables are used in the Taylor series expansion to generate a number indicative of the reflectance of a master note patch to be compared to the test patch under inspection. Ideally, on an acceptable note the comparison results in zero difference.

BRIEF DESCRIPTION OF THE DRAWINGS

FIG. 3 is a graphical illustration useful in understanding the manner of modifying a stored composite note.

DESCRIPTION

Figure 1:
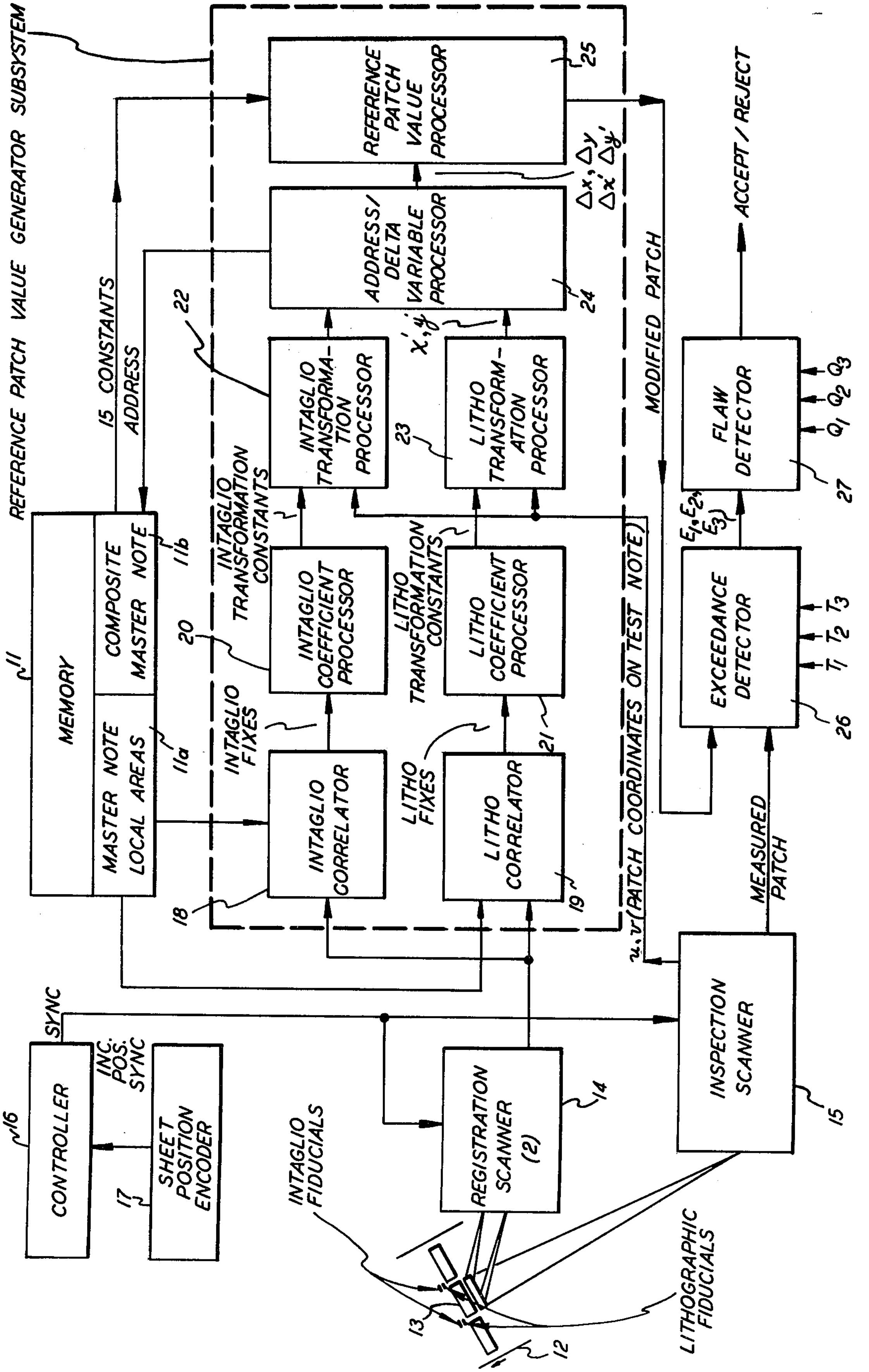
FIG. 1 is a block diagram of a preferred embodiment of the present invention.

Referring to FIG. 1, there is shown a memory 11. Memory 11 comprises two parts, a master note local memory 11*a* and a composite master note memory 11*b*.

The memory 11 stores permanent data which is used in the cross-correlation process to be described hereinafter and the plurality of constants from which the constants are selected to solve the Taylor series hereinafter referred to as the polynomial equation for each reference patch value of the synthetic master note.

The master note patch memory 11*a* contains three intaglio areas and three lithographic areas inserted therein by the high resolution scanning of a flawless master note whose intaglio and lithographic images are in nominal, i.e., perfect registration.

The composite master note memory 11*b* stores a plurality of previously calculated constants in sets associated with a reference point.

The foregoing data is permanently stored in memory 11 and is changed only for the type, e.g., denomination or nationality of the notes to be inspected and changed.

A transport system 12 transports sheets each containing, e.g., three notes 13 across and six notes along its length in the direction of the arrow past two registration scanners 14 and a quality inspection scanner 15. While the present invention is capable of inspecting three notes at a time, discussion herein is confined to the inspection of a single note.

The registration scanners 14 and inspection scanner 15 are solid state, charge-coupled device line array cameras. The registration scanners 14 images picture elements, i.e., pixels at high resolution, e.g., 0.1 mm×0.1 mm. These scanners scan along spaced separate paths and provide precise data regarding the intaglio and lithographic images of the particular note being examined. The inspection scanner 15 is identical to the registration scanner 14 except that it is of lower resolution on the order of 1 mm×1 mm pixels which are the size of the test patch values selected for comparison with equal size reference patch values.

Figure 2:
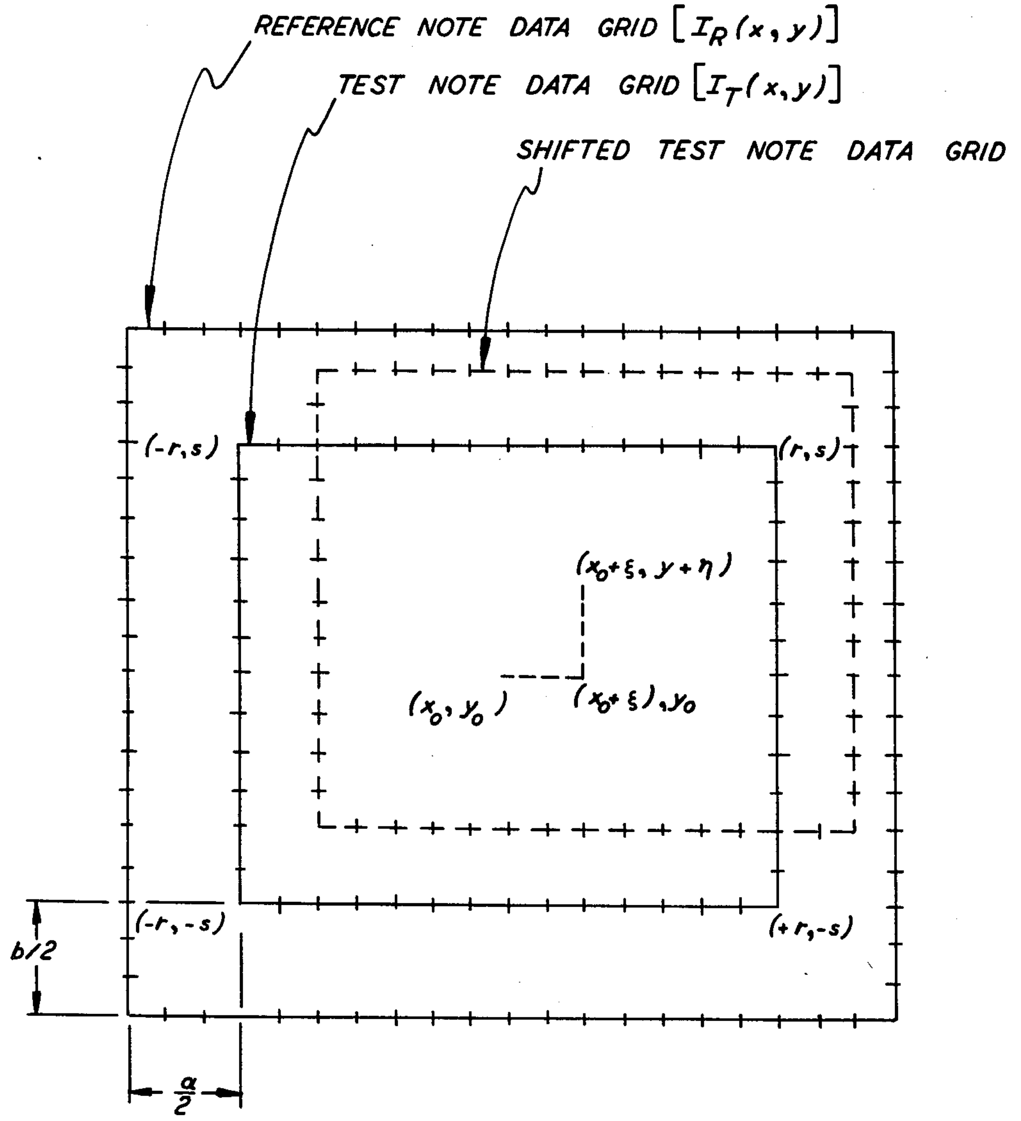
FIG. 2 is a graphical illustration useful in understanding the cross-correlation function.

The outputs of the registration scanners 14 are connected to correlators 18 and 19 which also receive inputs from master note patch memory 11*a*. Each note 13 on a sheet has fiducial marks representative of the registration of intaglio and lithographic images. However, these give only a rough fix which is used to assure the shifted test note data grid is entirely within the reference note data grid when the images are registered. This condition is illustrated in FIG. 2 in which the registration point is ($X_o+\xi$, $y_o+\eta$) and the shifted test note data grid (indicated by the dashed area) does not extend beyond the reference note data grid.

The intaglio and lithographic images are each separately cross correlated with corresponding patches stored in the master note patch memory 11*a*.

The registration scanner 14 selects three intaglio areas on the test note 13 which corresponds to the three intaglio areas stored in master note patch memory 11*a* and provide them as inputs to correlator 18. Three lithographic areas are also selected from the test note 13 which correspond to the three lithographic areas stored in master note local memory 11*a* and provides them as inputs to correlator 19. Selection of test note data grids (an array of contiguous pixels on the test note) that fall within the acquisition range of the cross correlator is assured through use of the fiducials. The fiducials are imprinted by the same plates which imprint the note images. Hence once the fiducials are located the intaglio and litho images are also located to the accuracy at the relative position between fiducials and note images.

Correlator 18 cross correlates each of the three intaglio areas acquired from the test note 13 with their corresponding intaglio areas from master note patch memory 11*a* and provides as outputs a pair of coordinates for each of the three correlations. These three sets of coordinates give the exact location of the centroids of each test note intaglio area with respect to the centroids of the intaglio area stored in master patch note memory 11*a* and, therefore, with respect to the synthetic master memory.

In a similar manner correlator 19 cross correlates each of the three lithographic areas acquired from the test note 13 with their corresponding lithographic areas from master note local memory 11*a* and provides as outputs a pair of coordinates for each of the three correlations. These three sets of coordinates give the exact location of the centroids of each test note lithographic area with respect to the centroids of the lithographic areas stored in master patch note memory 11*a* and, therefore, with respect to the synthetic master memory 11*a*.

FIG. 2 graphically illustrates the computation of a point of the cross-correlation function. Basically, the cross-correlation function solves a double summation equation of the form:

$$\phi(\xi,\eta) = \sum_{i=-r}^{i=r} \sum_{j=-s}^{j=s} I_T(x_i, y_j) I_R(x_i-\xi, y_j-\eta) =$$

CROSS-CORRELATION FUNCTION

The Reference Note Data grid represents either an intaglio or lithographic area from master note local memory 11*a*. The Test Note Data Grid represents the corresponding test area obtained from correlators 18 or 19. The Reference Note Data grid is chosen to be larger than the Test Note Data grid so that the Test Note Data grid will always be acquired within the borders of the Reference Note Data grid and may be shifted by increments therein. In a practical embodiment the Reference Note Data grid was chosen as 48×48 pixels with the Test Note Data grid chosen to be 32×32 pixels. A first value of the function is obtained by overlaying the centroids of both images, multiplying all corresponding points and adding the products. To obtain $\phi$ ($\xi$,y1), the Test Note Grid is shifted as shown by the dashed line in FIG. 2 and the process is repeated for every possible position of the Test Note Data grid within the Reference Note Data grid.

The largest number obtained by this method identifies the coordinates of the registration point. This is done for each intaglio area and lithographic area and provides three pairs of coordinates to the intaglio coefficient processor 20 and three pairs of coordinates to the lithographic coefficient processor 21. The six sets of coordinates are used to spatially correct for test note rotation and distortion.

The processors 20 and 21 receive these intaglio and lithographic coordinates or fixes as inputs, respectively. Each of processors 20 and 21 generates six transformation constants which are used to determine for any given point on the test note where that point falls on the master note.

Processor 20 which receives the three sets of intaglio image coordinates from correlator 18 computes the six intaglio transformation constants. Processor 21 which receives the three sets of lithographic image coordinates from correlator 19 computes the six lithographic constant. These constants are computed for each test note scanned and, as aforesaid, are used to determine any point on the test note relative to the hypothetical master note. The latter type of computation is a form of image rectification whereby an image A of a given scene is transformed into an image B of the same scene.

Digital image rectification is the process of mapping pixel intensities from an input image to an output rectified plane. This mapping is a bivariate coordinate transformation that takes into account all modelable distortions between the two images. The general form of a polynomial transformation between the two images is:

$$u = \sum_{i=o}^{n} \sum_{j=o}^{n-i} a_{ij}x^iy^j \quad (1)$$

$$v = \sum_{i=o}^{n} \sum_{j=o}^{n-i} b_{ij}x^iy^j \quad (2)$$

where:

x,y=coordinates of points in image A (Test note)

u,v=coordinates of points in image B (reference note)

aij,bij=coefficients (constants) that define the transformation n=order of the polynomial A special case of the above polynomial is where i=J=1 i.e. the transformation is linear. In the present system it has been verified through tests that the errors introduced by utilizing a linear transformation are well within tolerable error.

Where the transformation is linear the transformation simplifies to:

$$\mu = a_o + a_1 + a_2y \quad (3)$$

$$v = b_o + b_1 + b_2y \quad (4)$$

These equations are used to solve for the six constants $a_o$, $a_1$, $a_2$, $b_o$, $b_1$ and $b_2$ for each of the intaglio and lithographic transformation and once the two sets of constants are found the same equations are used to perform the actual transformation.

The intaglio constants are determined in intaglio coefficient processor 20 from two sets of three simultaneous equations in three unknowns by substituting the fix data from correlator 18 into equations 3 and 4 above. The six resulting equations are:

$$\left.\begin{array}{l}\mu_i = a_o + a_1X_i + a_2y_i \\ v_i = b_o + b_1x_i + b_2y_i\end{array}\right\} i = 1, 2, 3$$

The subscript i is used above to refer to the number of the intaglio fix. These six equations are solved simultaneously for the six unknowns $a_o$, $a_1$, $a_2$, $b_o$. $b_1$, $b_2$.

In a similar manner the six lithographic constants $a_o$, $a_1$, $a_2$, $b_o$, $b_1$ and $b_2$ are determined in the litho coefficient processor 21 by solving the above equations using the three litho fixes obtained from litho correlator 19.

Once the two sets of six constants are obtained the transformation of any point on the test note into one on the master note is possible.

This calculation is performed in processors 22 and 23, respectively, for each patch on the test note as seen by inspection scanner 15 to formulate therein the address of the fifteen constants in memory needed to compute a reference patch value corresponding to a particular test patch.

Processors 22 and 23 receive the six intaglio constants and six lithographic constants, respectively. In addition, processors 22 and 23 receive inputs (u, v) from inspection scanner 15 indicative of which test patch of a line of test patches are being scanned to insure that the particular reference patch address to be generated corresponds to the appropriate test patch being scanned. While not shown, the test patch values in a scan line which is the mode in which inspection scanner sees them may be stored in a buffer and clocked out for comparison with the appropriate reference patch. In any event synchronization of the test patch with the appropriate reference patch is accomplished by the input from inspection scanner 15 to processor 22 and 23 by detection by the inspection scanner 15 of the intaglio and lithographic fiducials associated with each test note. This provides the coordinates, e.g., the scan line (u) and patch number (v) within a scan line to the processors 22 and 23. This enables intaglio transformation processor 22 to compute the coordinates (X, y) on the synthetic master note of the intaglio image on the test patch under inspection. It also enables litho transformation processor 23 to compute the coordinates ($X^1$, $y^1$) of the litho image on the test patch under inspection.

The address of the 15 constants required from memory and the variables in the Taylor series expansion equations are determined in the Address/Delta Variable Processor 24 as described below for the condition in which the image misregistration is small. The address of the constants consists of two coordinates, an X and a y component. Both components are determined in a similar manner. We typically illustrate the technique by considering the component of the address assuming 16 bit processors are used to perform the digital computations. In this case the output of intaglio transformation processor 22 will be a 16 bit binary word. The scaling in the system would be adjusted so that one of the bits in this 16 bit word has the units of the center to center spacing of the reference points in the synthetic master memory. Assuming the center to center spacing is 0.5 mm (as appears reasonable based upon work on specific currencies investigated), the significance of each bit in the digital work representing X in the output of processor 22 would be made to be as shown below by proper scaling.

$0.5\ \text{mm} \times 2^9$ $0.5\ \text{mm} \times 2^1$ $0.5\ \text{mm} \times 2^2$ 0.5 mm $0.5\ \text{mm} \times 2^{-1}$ $0.5\ \text{mm} \times 2^{-2}$ $0.5\ \text{mm} \times 2^{-6}$

| | | | | | | | | | | | | | | | |
|---|---|---|---|---|---|---|---|---|---|---|---|---|---|---|---|
| 10 | 15 | 14 | 13 | 12 | 11 | 10 | 9 | 8 | 7 | 6 | 5 | 4 | 3 | 2 | 1 |

← 16 bit digital word (X) (each bit is either 1 or 0) →

Note that when bit number 7 in X changes it corresponds to a change in the position of the test patch equal to the center to center spacing of the reference points in synthetic master note memory, i.e., 0.5 mm. The resolution of patch position is $0.5\ \text{mm} \times 2^{-6} = 0.0078125$ mm. The maximum note dimension just can be accommodated is $2 \times 0.5 \times 2^9\ \text{mm} = 512$ mm. Both resolution and maximum dimension are adequate to meet inspection system requirements. The X component of master memory address is determined by adding ½ the center to center spacing of reference points in master memory (½ c=0.25 mm) to X and truncating the result as described below. Since bit number seven represents 0.5 mm the word for 0.25 mm has a 1 in bit position six and zeros everywhere else. The X position six and zeros everywhere else. The X component of the address of the constants for the test patch under inspection is obtained from bits 7 to 16 of X+½ C as shown below:

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| $\alpha + \frac{1}{2}C =$ | x | x | x | x | x | x | x | x | x | x | x | x | x | x | x | x |
| | ↓ | ↓ | ↓ | ↓ | ↓ | ↓ | ↓ | ↓ | ↓ | ↓ | | | | | | |
| $X_R =$ | x | x | x | x | x | x | x | x | x | x | 0 | 0 | 0 | 0 | 0 | 0 |

The X variable (Delta X) in the Taylor series expansion is given by:

$$\Delta X = X_R - (X + \tfrac{1}{2}C)$$

It may be noted this yields a variable having a maximum of 6 bits plus sign.

In general there are 4 coordinates which define a synthetic master memory address and 4 variables in the Taylor series expansion. Each coordinate and each variable is determined in a manner similar to that described above. The number of coordinates required to determine a master memory address must always equal the number of variables in the Taylor series expansion.

FIG. 3 is a graphic illustration of the method of determining the address of the 15 constants in the synthetic master note memory. We consider the problem of determining the address of the 15 constants and the values of the 4 variables for the ith patch on the test note under inspection. We assume the intaglio transformation has located $P_{Ii}$ as the point on the master note corresponding to the centroid of the intaglio on the ith test note patch. Similarly we assume the litho transformation has located $P_{Li}$ as the point on the master note corresponding to the centroid of the litho on the ith test note patch. We observe $P_{Ii}$ falls within the region ABCD which determines maximum values of $\Delta X$, $\Delta Y$ with respect to reference point $X_r$, $Y_r$. Hence the first pair of coordinates of the master memory address are $X_r$, $Y_r$ and $\Delta X \Delta Y$ are the X and Y components of the vector $\delta_{TI}$.

Furthermore, we observe $P_{Li}$ falls within the region ABCD which it is assumed also determines the maximum value of $\Delta X^1$, $\Delta Y^1$ with respect to reference point $X_r$, $Y_r$. Hence the second pair of coordinates of the master memory address is $X_r$, $Y_r$ (equal to the first pair) and $\Delta X^1$, $\Delta Y^1$ are the X and Y components of the vector $\delta_{TL}$. The image misregistration on the ith patch is the vector $\delta_{IL}$ which has terminal points on $P_{Ii}$ and $P_{Li}$.

Now consider the more general case in which the image misregistration is relatively large but still within the maximum limits of ±2 mm. This is illustrated by moving $P_{Li}$ to $P_{Li}^1$. Observe $P_{Li}^1$ is now in region EADF while $P_{Ii}$ remains in region ABCD. This means the reference point for the intaglio remain at $X_r$, $Y_r$ while the reference point for the litho is now $X_r$, $Y_{r\text{-}1}$. By analogy with the above procedure the 4 coordinates of master memory address are:

$$X = X_4$$
$$Y = Y_r$$
$$X^1 = X_r$$
$$Y^1 = Y_{r\text{-}1}$$

and $\Delta X$, $\Delta Y$ = X and Y components of $\delta_{TI}$ (as below)

$\Delta X^1$, $\Delta Y^1$ = X and Y components of $\delta_{TL}^1$

It is evident the above analysis may be applied to determine master memory address and values of the 4 variables in the Taylor series expansion for any position of the points $P_{Ii}$ and $P_{Li}$.

Processor 25 performs the solution of the series approximation polynomial utilizing the four variables $\Delta x$, $\Delta y$, $\Delta x^1$, $\Delta y^1$ provided by processor 24. Processor 25 also receives the fifteen constants necessary for the solution of the polynomial from composite master not memory 11*b* which has been accessed by the address formulated in processor 24 and brought out to processor 25.

The solution of the series approximation polynomial is done for each reference patch value on the test note under inspection of which there are approximately 12,000 in a typical currency note with each patch being 1 mm by 1 mm. Thus, for each test note inspected the polynomial is solved 12,000 times. Each solution generates one reference patch value which is ideally equal to the reflectance of the test patch value under inspection integrated over its area, i.e., 1 mm by 1 mm. Each reference patch value thus generated respresents a flawless patch of the hypothetical master note having the same misregistration between the intaglio and lithographic as the test note scanned. Notes that are misregistered beyond the tolerance of ±2 mm are rejected by thresholding $X^1-X$ and $Y^1-Y$ at 2 mm and using the resulting exceedance to reject the note.

Each reference patch value generated, i.e., each solution of the series approximation polynomial is provided as an input to exceedance detector 26 which also receives inputs representative of each test patch value in each scan line from inspection scanner 15. Since the misregistration between the intaglio and lithographic images of the generated hypothetical master note has been constrained to be equal to that of each test note inspected the problem of flaw inspection reduces to that used in the inspection of single image test notes, e.g., United States currency where a stored master note is compared to the test note.

This comparison is done in multilevel exceedance detector 26. Data inputs to exceedance detector 26 are reference patch value and test patch value. Programmable constant inputs are threshold setting $T_1$, $T_2$, and $T_3$ which are monotonically decreasing positive integer numbers. Exceedance detector 26 provides outputs $E_1$, $E_2$ and $E_3$ for every patch tested. These outputs are defined as follows:

| | | |
|---|---|---|
| $E_1 = +1$ | if | $\Delta P > T_1$ |
| $E_1 = 0$ | if | $-T_1 \leqq \Delta P \leqq T_1$ |
| $E_1 = -1$ | if | $\Delta P < -T_1$ |
| $E_2 = +1$ | if | $\Delta P > T_2$ |
| $E_2 = 0$ | if | $-T_2 \leqq \Delta P \leqq T_2$ |
| $E_2 = 1$ | if | $\Delta P < -T_2$ |
| $E_3 = +1$ | if | $\Delta P > T_3$ |
| $E_3 = 0$ | if | $-T_3 \leqq . P \leqq T_3$ |
| $E_3 = -1$ | if | $\Delta P < T_3$ |

where

ΔP = difference between test patch valve and reference patch valve

Accept/reject decisions are made in flaw detector 27. Data inputs to flaw detector 27 are $E_1$, $E_2$, $E_3$. Programmable constant inputs are flaw cluster parameters $Q_1$, $Q_2$, and $Q_3$. Accept/reject decisions are made in accordance with the following alogrithms, all of which operate in parallel, i.e., reject decision on any algorithm cause the note to be rejected.

$$|\Sigma E_1| > Q_1 \rightarrow \text{Reject}$$

$$|\Sigma E_2| > Q_2 \rightarrow \text{Reject}$$

$$|\Sigma E_3| > Q_3 \rightarrow \text{Reject}$$

The numbers $Q_1$, $Q_2$ and $Q_3$ are monatonially increasing positve integer numbers (e.g. 0, 3, 6) selected so that the first of the above algorithms is aimed at finding defects which show up on a single patch, the second is aimed at finding defects which show up on a small cluster of patches (not necessarily contiguous), and the third algorithm is aimed at finding defects which show up on a relatively huge cluster of patches. Flaws are most likely to be detected by the algorithm designed to detect them. Three algorighms have been found to be an optimum number for the type of flaws occuring on U.S. Currency. However, other currencies may require a different number of algorithms. Notes rejected by any one of the above algorithms are identified such as by marking.

The series approximation polynomial equation for generating each reference patch value as a function of the four variables and fifteen constants as a series expansion of the type:

$$P_I' = P_I + \left(\Delta x \frac{d}{dx_I} + \Delta y \frac{d}{dy_I} + \Delta x' \frac{d}{dx_L} + \Delta y' \frac{d}{dy_L}\right) P(0,0,0,0)$$

$$+ \frac{1}{2}!\left(\Delta x \frac{d}{dx_I} + \Delta y \frac{d}{dy_J} + \Delta x' \frac{d}{dx_L} + \Delta y' \frac{d}{dy_L}\right)^2 P(0,0,0,0)$$

$$\vdots \qquad \vdots \qquad \vdots$$

$$+ \frac{1}{n}\left(\Delta x \frac{d}{dx_I} + \Delta y \frac{d}{dy_J} + \Delta x' \frac{d}{dx_L} + \Delta y' \frac{d}{dy_L}\right)^n P(0\,0\,0\,0)$$

where $P_I'$ = modified patch value $P_I$ = original patch value

The quantities in brackets on the right side of the above equation is in operator notation. For example:

$$\left(\Delta X \frac{\delta}{\delta X}\right) P(0,0,0,0) = \Delta X \frac{\delta P(0,0,0,0)}{\delta X}$$

where: $\frac{\delta P(0,0,0,0)}{\delta X}$ = derivative of the reflectance function evaluation at $\Delta X = \Delta Y = \Delta X^1\,\Delta Y^1 = 0$ As defined above, the constant $P_I$ is equal to the value of the function at the centroid or reference point of the region of validity for the function and the other constants are obtained from the higher order derivatives of the function at the centroid or reference point of the function. It has been found that for purposes of this invention the Taylor series expansion may be truncated at the second order, i.e., n=2 to provide a polynomial expression of fifteen constants and four variables. One of the constants ($P_I$) is equal to the reference patch value when all delta quantities are zero, i.e., $\Delta x = \Delta y_I = \Delta x' = \Delta y' = 0$. If, as is usual, the four variables are not equal to zero the solution is $P(\Delta X, \Delta Y, \Delta X^1, \Delta Y')$, i.e., the modified patch value.

Relating the foregoing to the composite master note memory 11*b*, there must be a plurality of sets of fifteen constants stored in composite master note memory. While there are 12,000 reference patch values to be generated there must be at least 12,000 sets of fifteen constants to be stored. The number of reference points required is a function of range of validity of the Taylor series expansion, i.e., the maximum values of ΔX, ΔY, $\Delta X^1 \Delta Y^1$ which will satisfy accuracy requirements, the size of the note, and the maximum image misregistration which must be accommodated. It has been determined that these maximum values are normally less than half the patch dimension. This causes the number of reference points to be greater than the number of patches on the test note.

The 15 constants are determined in a two step process. Step 1 is to generate a description of the function as a set of numbers which give the value of the function at equally spaced increments in each of the 4 variables ($\Delta x$, $\Delta Y$, $\Delta X'$, $\Delta Y^1$). This can be done for example by making measurements on a set of notes having equally spaced increments of image misregistration. Other more practical methods of achieving the same result are also available. The second step is to approximate the numerical description of the function by a polynomial. The case of $n=2$ described above corresponds to using a second order (quadratic) polynomial in 4 variables. Each of the 15 constants in the quadratic polynomial is as the sum of products of each of the data points in the numerical description of the function and a set of constant multiples referred to as convolutes. The mathematical process by which the constants are determined is referred to as convolution. The convolutes are determined to satisfy some "goodness" of fit such as minimum squared difference between the points determined from the analytic equation and the corresponding data points. The number of convolutes will always be equal to the number of data points in the data set which describes the function. The coefficients of the variables in the Taylor series expansion are the same as the coefficients of the same variables in the quadratic polynomial. The constant terms are almost but not exactly equal. In general, the difference between the two approximation equations is negligible.

The set of 15 constants is retrieved by computing the centroid of the approximation range and using that data to determine the address at the 15 constants as previously described.

Thus, as each test note is scanned an address is formulated to bring out from memory the fifteen constants which together with the four variables permit the solution of the series approximation polynominal to give a reference patch value for each test patch value of a test note scanned. Each reference patch value is the representation of a perfect reference patch value modified to accommodate for the image misregistration of the test note. After all of the reference patch values are compared to their corresponding test patch value, the note is adjudged acceptable or not.

When currency is printed on a web press it is printed in repeating patterns which are referred to as sheets. For example, a typical sheet on a web press consists of 6 rows of notes with each row having 3 notes so that a sheet consists of 6 rows and 3 columns. The registration and inspection scanners must be synchronized to sheet position within the acquisition range of the registration scanner (about ±0.5 mm). These functions are provided by the sheet position encoder 17 and controller 16. The sheet position encoder senses sheet position by detecting fiducial marks printed on the sheet for the purpose of enabling approximate sheet position to be easily sensed. Alignment between sheet position encoder, registration scanner, and inspection scanner is established during fabrication of the equipment.

Other modifications of the present invention are possible in light of the above description which should not be construed as placing limitation on the invention other than those specifically set forth in the claims which follow:

What is claimed is:

1. An inspection apparatus for detecting flaws on test documents having multiple misregistered images, comprising in combination, first means for optically scanning test documents, second means generating in real time a reference document having the same misregistration between images as the test document being scanned, third means comparing said test document with said generated reference document for identifying a flawed test document.

2. An inspection apparatus according to claim 1, wherein said second means includes, first memory means storing at least three selected areas for each type of image of a perfect document with no misregistration between images.

3. An inspection apparatus according to claim 2 wherein said second means further includes, optical scanning means for scanning selected areas of a test document corresponding to those stored areas of said perfect document.

4. An inspection apparatus according to claim 3, wherein said second means further includes correlation means for each of said stored images connected to said first memory means for locating the centroid of each area on the test document with respect to the centroid of the stored areas of said perfect document.

5. An inspection apparatus according to claim 4, wherein said second means further includes transformation means connected to each of said correlation means and to said first means for determining the position of any point on the test document relative to the position of a corresponding point on the reference document.

6. An apparatus according to claim 5, wherein said second means further includes second memory means storing a plurality of sets of constants at uniquely addressable points therein.

7. An apparatus according to claim 6, wherein said second means further includes first processor means connected to said transformation means and said second memory means for formulating an address of the ones of said sets of stored constants corresponding to the coordinates of the particular patch on said test document being scanned by said first means and for generating a set of variables representative of the misregistration of said images.

8. An apparatus according to claim 7, wherein said second means further includes second processor means connected to said first processor means and said second memory means generating a reference patch value corresponding to each particular patch of the test document being scanned.

9. An apparatus according to claim 8 wherein said third means includes, exceedance detector means connected to said first means and said second processor means wherein each of said reference patch values is compared with its corresponding test patch value to determine if said test document meets predetermined quality standards.

10. An inspection apparatus according to claim 9 further including, flaw detection means connected to said exceedance detector means for identifying each test document that does not meet said predetermined quality standards.

11. An inspection apparatus according to claim 10 wherein said flaw detection means makes accept or reject decisions on local areas of the test document being examined and then indexes local areas to cover the entire note.

12. An inspection apparatus according to claim 11 wherein said flaw detection means comprises a multiplicity of flaw detectors using accept or reject criteria operating in parallel, each aimed at finding a class of defects such as singles, small clusters, and large clusters.

13. An inspection apparatus according to claim 10 wherein said multiplicity of flaw detectors all of which reject a test note when the magnitude of the sum of exceedances is greater than some number Q where Q is a positive integer which determines the number of defects in a cluster of defects to be identified for the purpose of rejecting the note.

* * * * *